United States Patent [19]
Guo

[11] Patent Number: 5,703,865
[45] Date of Patent: Dec. 30, 1997

[54] METHOD AND APPARATUS FOR MAGNETO-OPTICAL RECORDING AND READING USING OPTIMIZED LASER POWERS

[75] Inventor: Ann Guo, Fremont, Calif.

[73] Assignee: Maxoptix Corporation, Fremont, Calif.

[21] Appl. No.: 751,712

[22] Filed: Nov. 18, 1996

[51] Int. Cl.$^6$ .................................................. G11B 7/00
[52] U.S. Cl. ............................ 369/116; 369/54; 369/48
[58] Field of Search ........................... 369/116, 47, 48, 369/54

[56] References Cited

U.S. PATENT DOCUMENTS 5,420,837  5/1995  Saito et al. ................................. 369/13
5,631,890  5/1997  Ikeda ....................................... 369/116

OTHER PUBLICATIONS

Yoshihiro, Masafumi et al., "Write/Erase Cyclability of TbFeCo for Mark–Edge Recording" Jpn. J. Appl. Phys. vol. 32 (1993) Pt. 1, No. 11B, pp. 5441–5442.

Uchino, Ken–ichi et al., "High–Density Pulse Width Modulation Recording and Rewritable Capability in GeSb Te Phase–Change System Using Visible Laser Beams at Low Linear Velocity" Jpn. J. Appl. Phys. vol. 32 (1993) pp. 5354–5360.

Mansuripur, Masud and Connell, G. A. N., "Laser–induced local heating of moving multilayer media" *Applied Optics* vol. 22, No. 5, Mar. 1, 1983, pp. 666–670.

Mansuripur Masud et al., "Laser–induced heating of multi-layers" Applied Optics, vol. 21, No. 6, Mar. 15, 1982, pp. 1106–1114.

Mansuripur Masud "The Physical Principles of Magneto–optical Recording" Cambridge University Press (1995). pp. vii–xiv; 350–390.

*Primary Examiner*—Nabil Hindi
*Attorney, Agent, or Firm*—Blakely Sokoloff Taylor & Zafman, LLP

[57] ABSTRACT

A magneto-optical (MO) disk drive. In one embodiment, the MO disk drive comprises a drive controller that controls operation of a laser source and a disk drive mechanism. The drive controller comprises a microprocessor and a memory subsystem coupled to the microprocessor. The memory subsystem comprises a memory device that stores programs directing operation of the disk drive and information used by the programs during operation of the disk drive. The stored information comprises an identifier that matches an identifier of a magnetic medium. The stored information also comprises a set of constant values characteristic of physical properties of the magnetic medium denoted by the letters h, k, s, c, $\alpha$, $\beta$ and $\delta$. The stored information also comprises a set of equations that determine optimum write powers as a function of linear velocity, v, of the magnetic medium. The equations include:

$Ph(v)=hv^\alpha$, $Ph(v)$ is a preheat power;

$Pk(v)=kv^\beta$, where $Pk(v)$ is a peak power;

$Pm(v)=Pk(v)+s$, where $Pm(v)$ is a maintenance power; and $Pc(v)=cv^\delta$, where $Pc(v)$ is a cooling power.

25 Claims, 10 Drawing Sheets

METHOD AND APPARATUS FOR MAGNETO-OPTICAL RECORDING AND READING USING OPTIMIZED LASER POWERS

FIELD OF THE INVENTION

The present invention relates to the field of magneto-optical (MO) recording systems, more particularly to method and apparatus for writing information to a MO disk.

BACKGROUND OF THE INVENTION

Magneto-optical disk recording involves transferring binary encoded information onto a rotating disk. The disk is typically composed of several layers, one of which is a "recording layer" of a magnetic medium. The magnetic medium is initialized by aligning the direction of magnetization in a single direction. Information is recorded on the medium by heating it with a laser sufficiently to cause the direction of magnetization to reverse locally, creating an information mark. Information is read from the medium by applying the laser to the medium and determining the direction of the plane of polarization of reflected light, which will vary with the direction of magnetization of the medium.

FIG. 1 shows a simplified MO disk 300. Disk 300 is divided into different areas for information storage such that each area is bounded by two radii of the disk. Such areas are referred to as zones. Typical MO disks include approximately thirty zones. For example, zone 302 occupies an area between a radius close to the center of the disk and a greater radius farther away from the center. Zone 304 occupies an area around a middle radius of the disk, and zone 306 occupies an area bounded by the outer radius of the disk. Zones are typically further divided into tracks. For example, track 308 is one of the tracks in zone 302. Marks are made by laser heating within tracks as the disk rotates. Because each track occupies a different radius, the linear velocity of the medium at each track is different. Tracks at outer radii have greater linear velocities than those at inner radii when the disk rotates.

In the magneto-optical recording field, the overall storage capacity of magneto-optical storage devices is continually increasing. One way to achieve greater storage capacity is to increase linear recording density by using a pulse width modulation (PWM) writing method. This method creates a mark which is read by detecting both the leading and trailing edges of the mark. Because both edges of the mark are read in PWM, however, the recording is more susceptible to non-uniform marks which decrease signal-to-noise ratio (SNR). Non-uniform marks are created by non-uniform heating across the medium.

FIG. 2 is an illustration of jitter margin, one quantification of the quality of a recorded mark that affects SNR. An ideal mark 202 and a mark 204 are shown. Mark 204 is exemplary of undesirable excess width and length of a mark that can result from improper write power. "T" represents a portion of a read clock cycle. Time 206 is referred to as Δx, the time in excess of the read clock cycle T required to read mark 204. Jitter margin is given as:

$$\text{jitter margin} = 1 - \frac{\Delta x}{T/2}$$

Jitter margin should be as close to 1 as possible.

One way to improve jitter margin and SNR is to heat the magneto-optical medium uniformly across written marks. Uniform heating temperature within the marks can improve the sharpness of the written transitions as well as reduce medium noise. The ability to heat the medium across all radii uniformly within the marks is critical to achieve higher density magneto-optical recording. Because temperature corresponds to write power, uniform heating requires optimum writing powers to be applied to the medium across all radii.

One past approach uses several different power levels to create one mark. According to this method, a preheat power, Ph, is first applied to pre-condition the mark, then a peak power, Pk, is used to write the leading edge of the mark. A maintenance power, Pm, is then applied to maintain uniform temperature within the mark. Finally, a cooling power, Pc, is applied to assure sharpness at the trailing edge of the mark. The cooling power is the same as the power used for reading. FIG. 3 illustrates what each of these multiple write powers look like over time. It should be understood that FIG. 3 is merely an example of the relative magnitudes of the powers and their sequence and duration of application. The scale of the figure does not indicate actual power magnitudes.

A problem still exists, however, in prior systems using this writing method. The actual values of the four powers are typically determined experimentally in order to achieve uniform heating within a given zone of the disk. But the optimized powers depend in part upon the linear velocity of the medium, which rotates beneath a write/read head during write operations. The difficult is that linear velocity is different for each zone because each zone occupies a different radius.

Another problem is that optimized powers also depend upon structural characteristics of the particular magnetic medium. It is currently too time consuming and costly to experimentally determine optimized powers for each possible radial position (i.e., linear velocity) of a medium. In addition, the exact relationship between write powers which produce the best marks and linear velocity is unclear. For these reasons, the prior practice has been to experimentally determine optimum write powers at two radii and then estimate write powers for the remaining radii by applying a simple, linear relationship. As a result of this prior practice, write powers for media have not been determined with enough accuracy to provide satisfactory SNR with increased linear recording density across an entire disk.

What is needed is a method and apparatus for determining optimum write powers for each zone of a disk without the need for excessive experimentation. As will be seen, the present invention provides a method and apparatus for determining, storing and using optimum write powers for each zone of a disk. In one embodiment, optimum write powers are determined, stored and used for each zone of a disk. The present invention thus achieves uniform heating across an entire disk, resulting in improved SNR and greater storage density.

SUMMARY OF THE INVENTION

A magneto-optical (MO) disk drive is described. In one embodiment, the MO disk drive comprises a drive controller that controls operation of a laser source and a disk drive mechanism. The drive controller comprises a microprocessor and a memory subsystem coupled to the microprocessor. The memory subsystem comprises a memory device that stores programs directing operation of the disk drive and information used by the programs during operation of the disk drive. The stored information comprises an identifier that matches an identifier of a magnetic medium. The stored information also comprises a set of constant values characteristic of physical properties of the magnetic medium denoted by the letters h, k, s, c, α, β and δ. The stored information also comprises a set of equations that determine optimum write powers as a function of linear velocity, v, of the magnetic medium. The equations include:

Ph(v)=hv^α, Ph(v) is a preheat power;

Pk(v)=kv^β, where Pk(v) is a peak power;

Pm(v)=Pk(v)+s, where Pm(v) is a maintenance power; and

Pc(v)=cv^δ, where Pc(v) is a cooling power.

DETAILED DESCRIPTION

Figure 1:
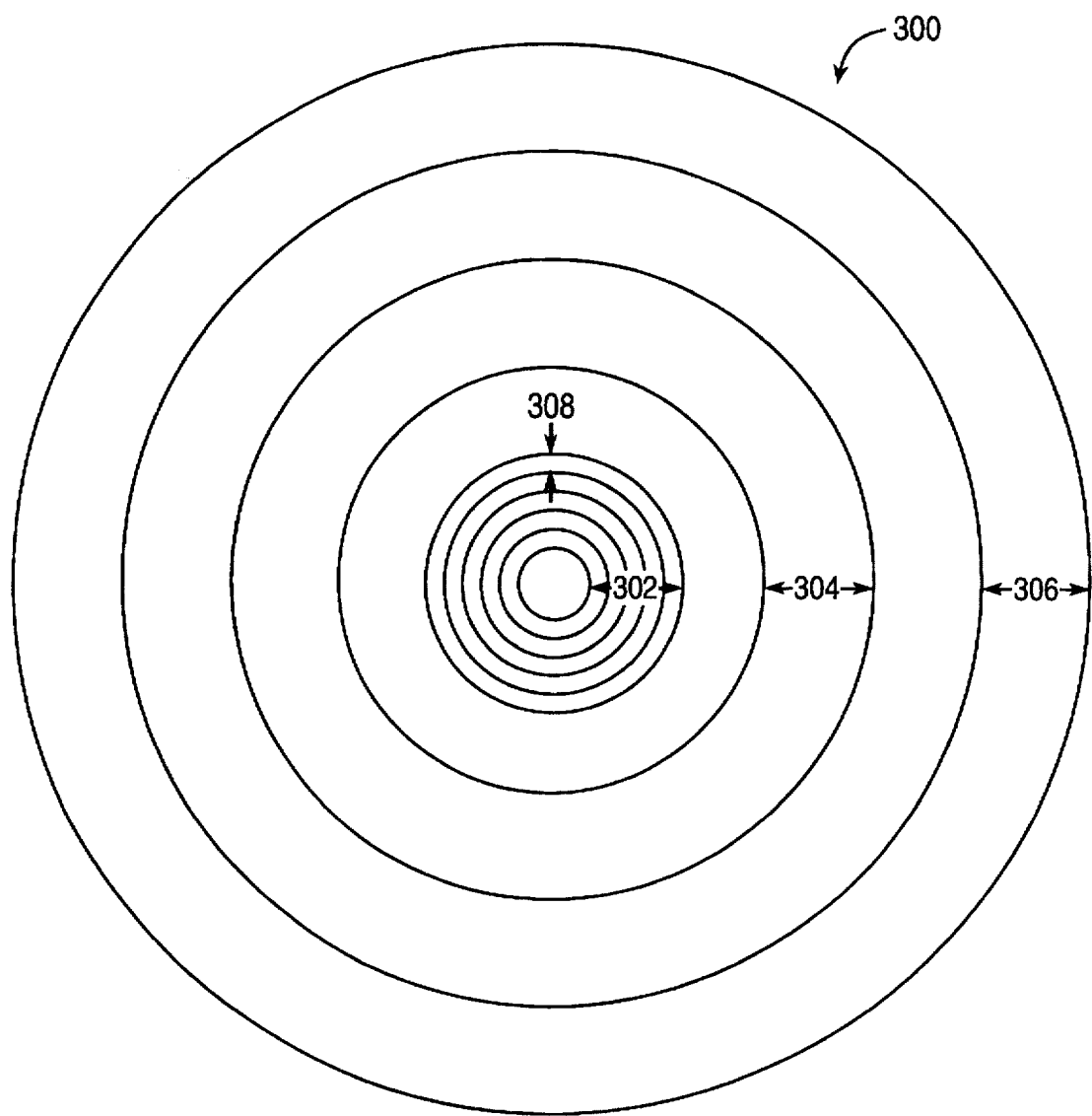
FIG. 1 is a simplified illustration of a magneto-optical disk.
Figure 2:
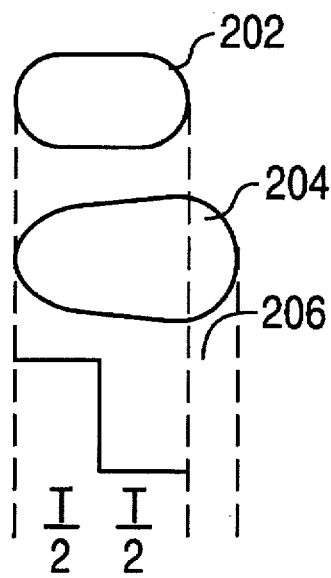
FIG. 2 is an illustration of jitter margin phenomenon.
Figure 3:
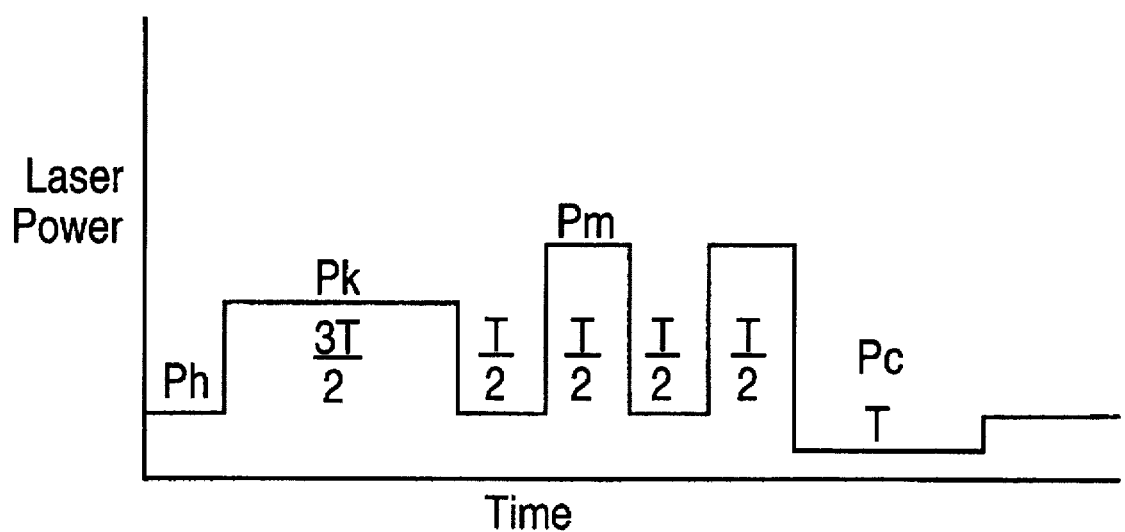
FIG. 3 is a plot of write power as a function of time.

In the following detailed description of the present invention numerous specific details are set forth in order to provide a thorough understanding of the present invention. However, it will be obvious to one skilled in the art that the present invention may be practiced without these specific details. In other instances well known methods, procedures, components, and circuits have not been described in detail to avoid unnecessarily obscuring the present invention.

The present invention includes novel equations relating write powers to linear velocity. As will be described, the use of the equations of the present invention in determining write powers for a particular medium produces unexpected results in that more uniform heating across the medium is achieved. For ease of reference, the following equations, which will be referred to herein by number, are listed:

$$Ph(v) = hv^\alpha; \quad (1)$$
$$Pk(v) = kv^\beta; \quad (2)$$
$$Pm(v) = mv^\gamma; \quad (3)$$
$$Pc(v) = cv^\delta; \quad (4)$$

$$\alpha = \frac{\log_x\left[\frac{Ph(v_0)}{Ph(v_1)}\right]}{\log_x\left[\frac{v_0}{v_1}\right]}; \quad (5)$$

$$h = \frac{Ph(v_0)}{v_0^\alpha}; \quad (6)$$

$$h = \frac{Ph(v_1)}{v_1^\alpha}; \quad (7)$$

$$\beta = \frac{\log_x\left[\frac{Pk(v_0)}{Pk(v_1)}\right]}{\log_x\left[\frac{v_0}{v_1}\right]}; \quad (8)$$

$$k = \frac{Pk(v_0)}{v_0^\beta}; \quad (9)$$

$$k = \frac{Pk(v_1)}{v_1^\beta}; \quad (10)$$

$$\gamma = \frac{\log_x\left[\frac{Pm(v_0)}{Pm(v_1)}\right]}{\log_x\left[\frac{v_0}{v_1}\right]}; \quad (11)$$

$$m = \frac{Pm(v_0)}{v_0^\gamma}; \quad (12)$$

$$m = \frac{Pm(v_1)}{v_1^\gamma}; \quad (13)$$

$$\delta = \frac{\log_x\left[\frac{Pc(v_0)}{Pc(v_1)}\right]}{\log_x\left[\frac{v_0}{v_1}\right]}; \quad (14)$$

$$c = \frac{Pc(v_0)}{v_0^\delta}; \quad (15)$$

$$c = \frac{Pc(v_1)}{v_1^\delta}; \quad (16)$$

$$Pm(v) = Pk(v) + s; \text{ and} \quad (17)$$
$$s = Pm(v) - Pk(v); \quad (18)$$

Figure 4:
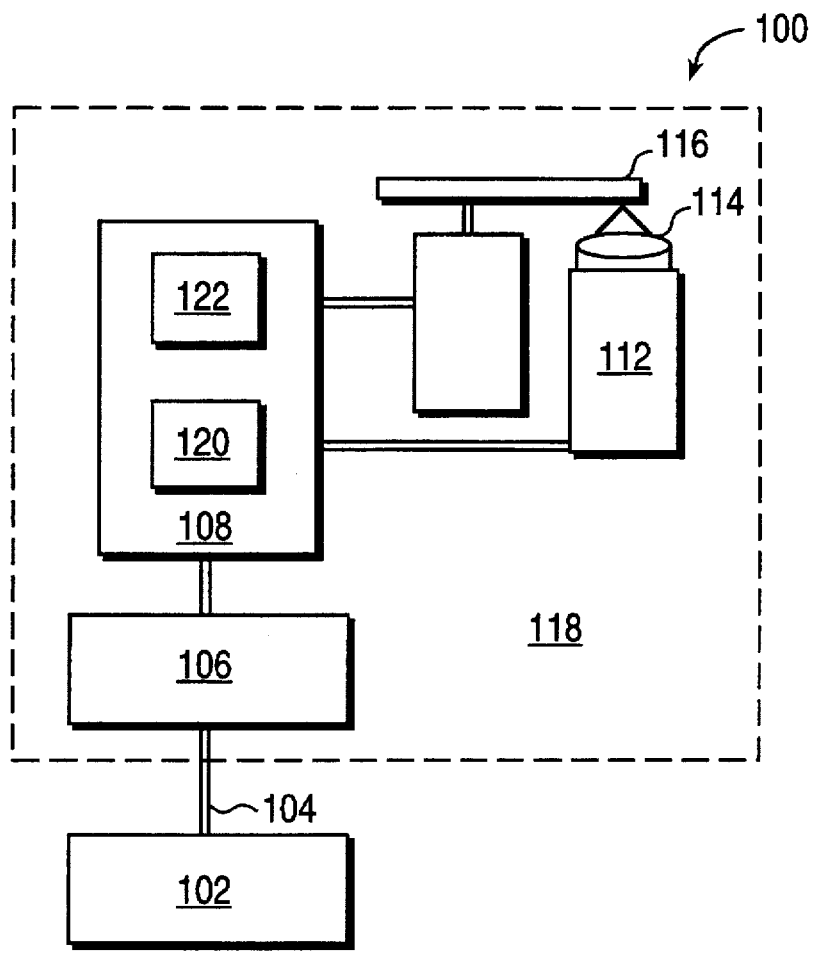
FIG. 4 is a block diagram of an embodiment of the magneto-optical disk drive system of the present invention.

FIG. 4 is a block diagram of an embodiment of magneto-optical disk drive system 100 of the present invention. Magneto-optical disk drive 118 is coupled to host computer 102 through small computer system interface (SCSI) 104. Host computer 102 may be coupled to magneto-optical disk drive 118 to transfer data between drive 118 and host computer 102. Host computer 102 typically views drive 118 in the same way as it would view a resident hard disk. SCSI controller 106 controls communications between drive 118 and host computer 102. Drive controller 108 is coupled to SCSI controller 106 and includes microprocessor 120 and memory subsystem 122. Memory sub-system 122 includes random access memory (RAM) and read-only memory (ROM). Memory subsystem 122 stores programs executed by microprocessor 120 during operation of disk drive 118 as well as data used by the programs. Drive controller 108 is coupled to disk drive mechanism and circuitry 110 and laser control mechanism and circuitry 112. Disk drive mechanism and circuitry 110 includes a spindle motor, a spindle servo and circuitry for communicating with drive controller 108. Laser control mechanism and circuitry includes a tracking motor, a seek motor, a photo-detector, and servos for focusing, tracking and seeking as well as circuitry for communicating with drive controller 108. Under direction of drive controller 108, laser control mechanism and circuitry 112 applies a laser beam to optical disk 116 through lens 114. The laser heats optical disk 116 during either a write operation or a read operation.

According to one embodiment of the present invention a mark representing coded information is written to optical disk 116 according to a method which uses four different powers for each mark. First, a preheat power is applied to precondition the area of the mark. Next, a peak power is applied to write fie leading edge of the mark transition. A maintenance power is then applied to keep the temperature within the mark transition uniform. A cooling power is finally applied to assure the sharpness of the trailing edge of the mark transition. The power used for cooling is the same as the power used for reading from optical disk 116.

Figure 9:
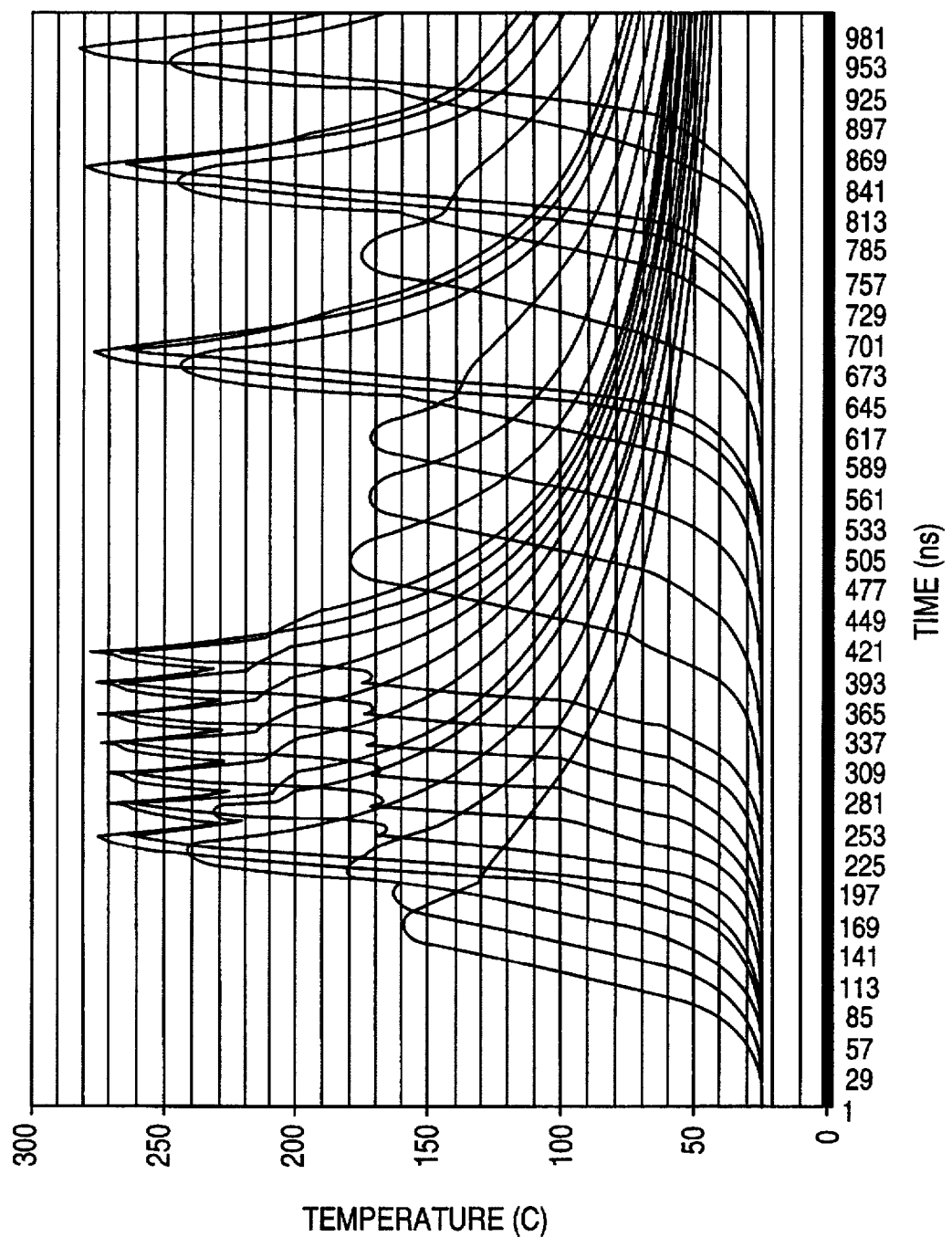
FIG. 9 is a temperature profile of a write operation at an inside diameter of a disk using experimentally determined optimum write powers.

In this embodiment of the present invention, which detects both leading and trailing edges of a mark when reading, it is critical to keep the temperature of the medium consistent during all write operations across the disk. FIG. 9 is an example of a temperature profile created during a write operation at a certain radius of optical disk 116. The temperature profile of FIG. 9 shows desirable temperature consistency. With prior methods of optimizing write powers for a medium, it was not possible to calculate powers for each area or track of the disk such that temperature profiles remained consistent across an entire disk.

Figure 6:
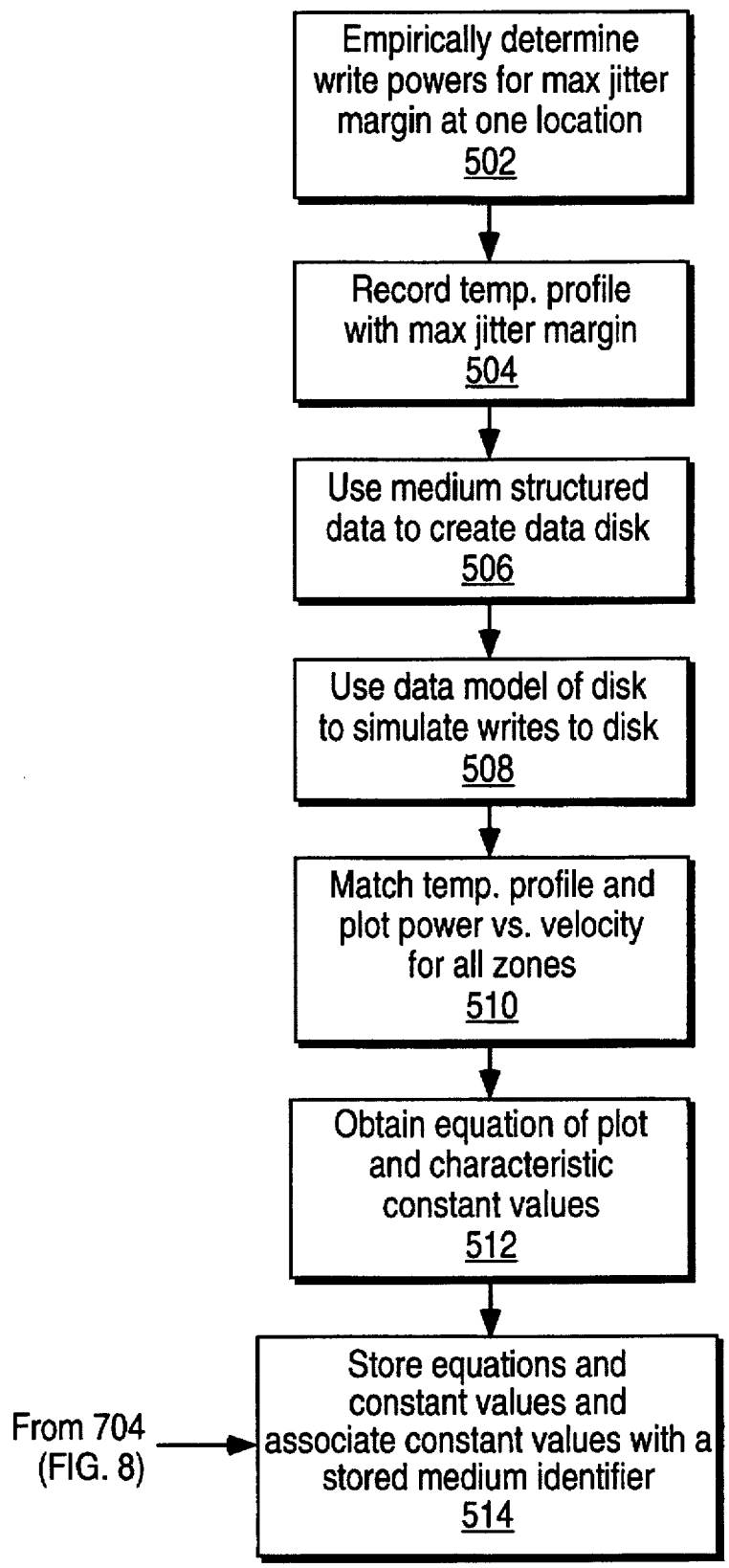
FIG. 6 is a flow diagram showing the process of optimizing and storing write powers for a medium.

According to this embodiment of the present invention, optimum write powers for each zone of a disk of a particular medium are calculated and stored on a storage device of memory subsystem 122. Referring now to FIG. 6, a flow chart of the method of this embodiment is shown. Beginning with step 502, write powers are determined at a particular zone of the disk empirically. Optimum write powers are those write powers at which maximum jitter margin is obtained. Once optimum write powers for a particular zone have been found, the temperature profile from a write operation using the powers is recorded at step 504.

In step 506, an ordinary simulation program is used to simulate writing to a disk of the particular medium so that write powers which produce the recorded temperature profile can be found. The simulation program takes as input structural data relating to the medium of the disk. The structural data is typically supplied by a disk vendor. The structural data relating to a particular medium typically includes thickness of a layer of the medium in nanometers, a complex diffraction number, the specific heat of the layer, and conductivity of the layer. These data are supplied for each layer of the disk. For example, in a six layer medium the data are provided for a substrate layer, a dielectric layer, a recording layer or magneto-optical layer, another dielectric layer, a reflective layer, and a protective layer. The software program uses the structural data to create a data model of the disk in step 506. In step 507 the data model of the disk is used to simulate writes to every zone of the disk. Software programs which create data models of physical objects and simulate behavior of the objects under varying conditions are commonplace and well within the ordinary skill of the art.

Figure 5:
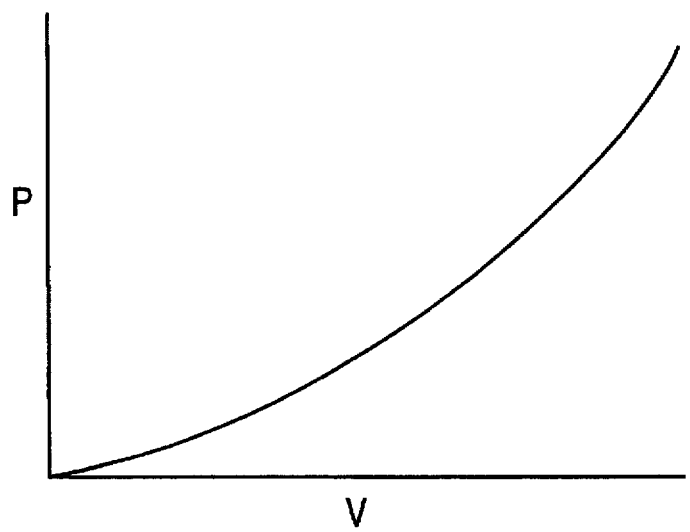
FIG. 5 is an exemplary plot of write power as a function of medium velocity.

The goal of the simulation as shown in step 510 is to match the temperature profile obtained in step 504 with a temperature profile obtained from a write to each zone on the disk so that powers creating the temperature profile can be found. Also in step 510, a plot is made of power as a function of velocity. Such a plot is shown in FIG. 5. A plot like the plot of FIG. 5 is made for each of the four powers, preheat power $Ph(v)$, peak power $Pk(v)$, maintenance power $Pm(v)$ and cooling power $Pc(v)$. The plot of FIG. 5 can be described as an equation. For example, equations (1)-(4) are equations derived from plots of $Ph(v)$, $Pk(v)$, $Pm(v)$ and $Pc(v)$ in step 512. Thus, a relationship between write power and medium velocity is established.

The values of constants h, k, m, c, $\alpha$, $\beta$, $\gamma$, and $\delta$ are obtained from plots of $Ph(v)$ $Pk(v)$, $Pm(v)$ and $Pc(v)$, respectively.

An alternate equation for maintenance power can be obtained from equation (18). Once s is determined from equation (18), maintenance power Pm can be found from equation (17). This is an alternative to finding Pm from equation (3). It may be preferable to use equation (17) rather than equation (3) to determine maintenance power Pm. This is because time is saved by eliminating the simulations that yield the plot of Pm as a function of velocity. Although equation (17) is not as accurate as equation (3) in determining a maintenance power which will yield the desired temperature profile, it has been found that maintenance power Pm is not as sensitive to jitter margin as, for example, peak power Pk. Therefore equation (17) saves time and expense and provides a satisfactory maintenance power.

Referring again to FIG. 6, at step 514 equations (1)-(4) or (1), (2), (17) and (4) are stored on a storage device of memory subsystem 122. The set of constant values denoted by h, k, m, c, $\alpha$, $\beta$, $\gamma$ and $\delta$ is also stored on the storage device. If equation (17) is used, the set of constants stored comprises values denoted by h, k, s, c, $\alpha$, $\beta$ and $\delta$. The set of constant values is associated with a medium identifier unique to the medium from which the constant values were obtained. The medium identifier is typically written on a disk in a certain location by the disk vendor.

Figure 7:
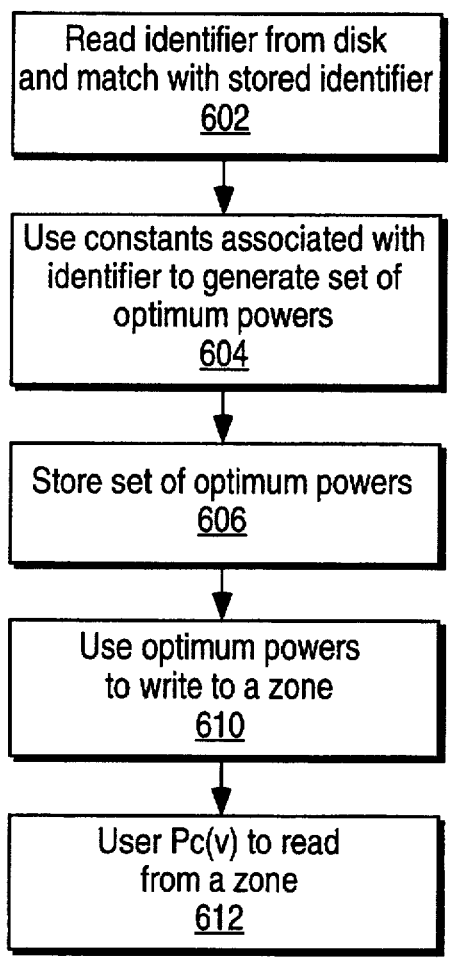
FIG. 7 is a flow diagram showing the process of writing/reading a disk using optimum powers according to an embodiment of the present invention.

FIG. 7 is a flow chart showing the steps for reading and writing disk 116 according to this embodiment. At step 602 an identifier is read from the disk and matched with an identifier stored in a memory device. The set of constant values associated with the identifier is used to generate a set of optimum write powers using equations (1)-(4) or equations (1), (2), (17) and (4) in step 604. The set of optimum write powers includes sets of four powers for each zone of the disk. A predetermined velocity associated with each zone is used in the equations in step 604. For example a velocity of the medium at a radius in the middle of a zone is used as the velocity for calculations of optimum powers for the zone.

At step 606, the set of optimum powers which includes the four powers necessary for a write operation, as calculated for every zone of the disk, are stored on the storage device. The sets of optimized powers for each zone are stored on a storage device of the disk drive using a software data structure such as a look-up table. Various software data structures for storing often-referenced data are well known in the art and provide efficient storage of data and short retrieval times.

During a write operation, at step 610, previously optimized powers for the particular zone of the medium being written to are used.

During a read operation, at step 612, the optimized cooling power, $Pc(v)$ which is the same as optimized reading power, is used to read from the particular zone of the medium.

FIG. 9 shows a temperature profile obtained empirically, according to steps 502 and 504. The write operation which produced the temperature profile of FIG. 9 was performed on the inner diameter of the disk, or at the smallest radius. The velocity of the medium was 12.24 m/s and the four powers used were: Ph=2.36 milliwatts; Pk=4.96 milliwatts; Pm=5.41 milliwatts; and Pc=2.00 milliwatts.

Figure 10:
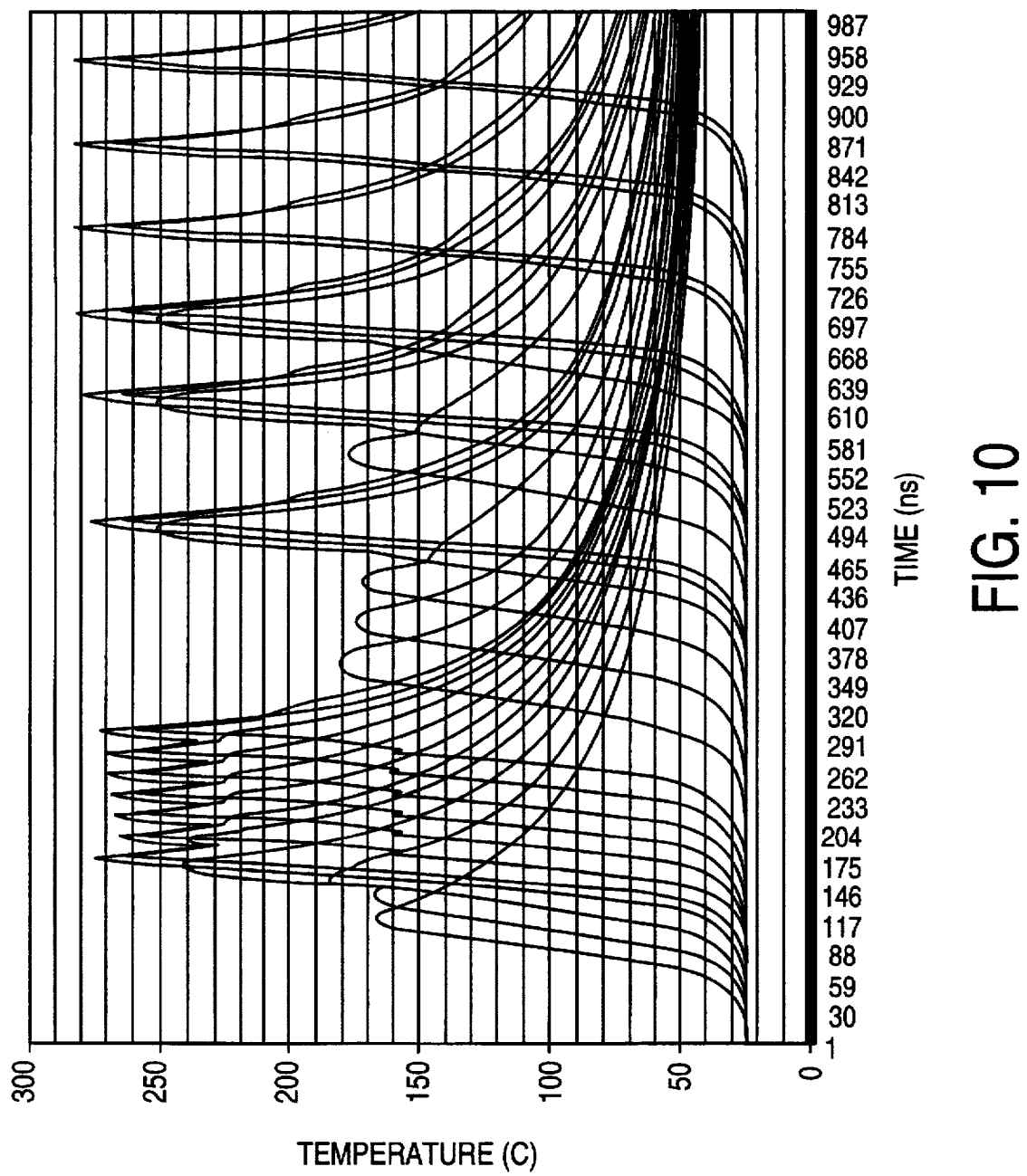
FIG. 10 is a temperature profile of a write operation at a middle diameter of a disk using optimum write powers obtained according to an embodiment of the present invention.
Figure 11:
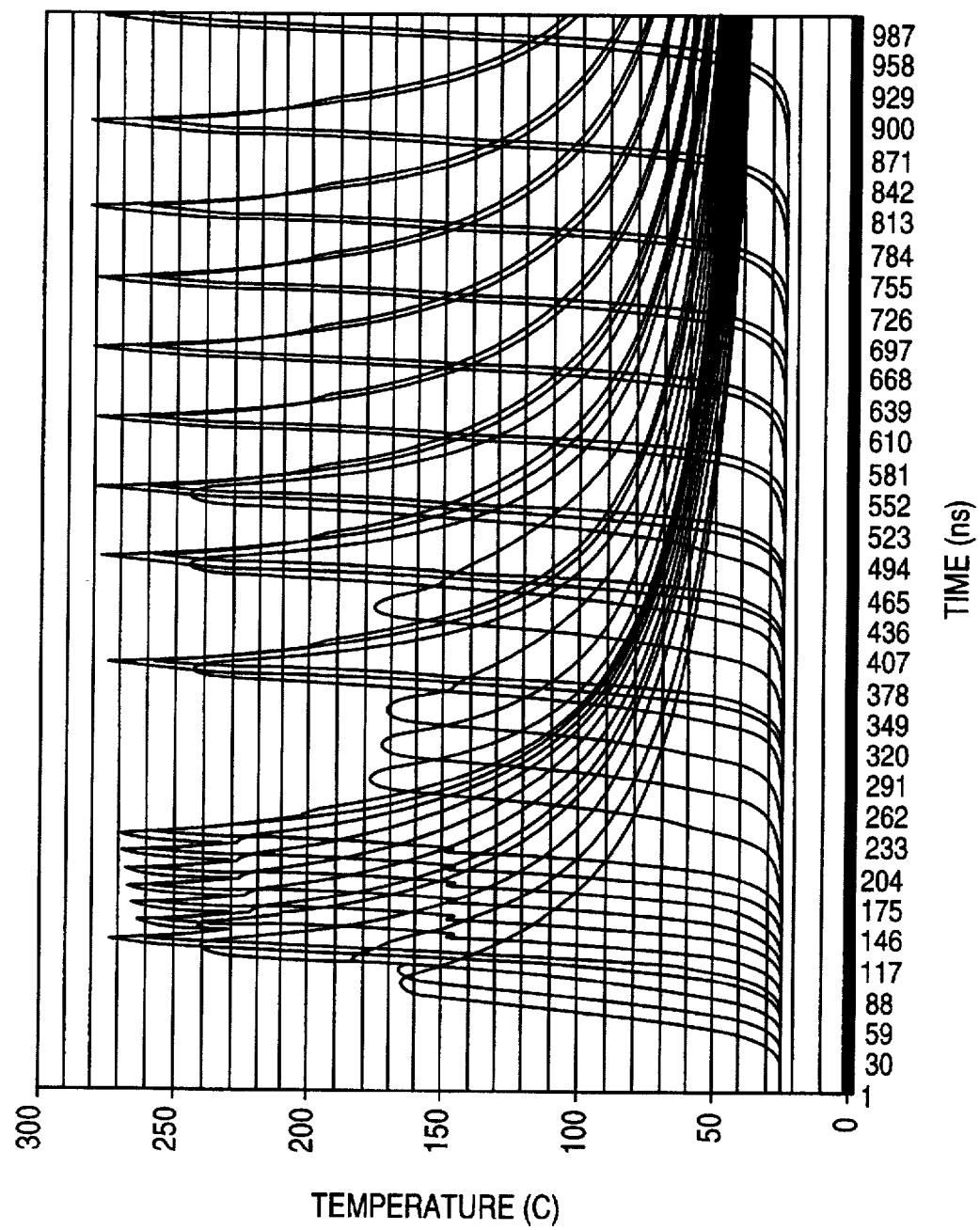
FIG. 11 is a temperature profile of a write operation at an outer diameter of a disk using optimum write powers obtained according to an embodiment of the present invention.

FIGS. 10 and 11 show temperature profiles for writes to the same medium at different radii. The writes were performed according to the present invention as described with respect to steps 506–514 and steps 602–610.

FIG. 10 represents the temperature profile of a write operation at a middle radius of the disk. Velocity of the medium was 15.74 m/s. The four powers used were: Ph=2.76 milliwatts; Pk=5.71 milliwatts; Pm=6.32 milliwatts; and Pc=2.23 milliwatts.

For the temperature profile as shown in FIG. 11, the write operation was to the outer diameter where velocity of the medium was the greatest at 21.12 m/s. Write powers used were: Ph=3.10 milliwatts; Pk=6.34 milliwatts; Pm=6.91 milliwatts; and Pc=2.42 milliwatts. As can be seen, the powers used in the write operations producing FIGS. 9–11 vary, yet the temperature profiles of FIGS. 9–11 are extremely consistent. Thus, the present invention allows much more accurate calculation of optimum write powers over different disk radii than was previously possible without excessive experimentation.

The present invention also includes the capability of more efficiently optimizing write powers in the case where structural data for a medium is not supplied by the vendor, or is unknown for some other reason. If structural data is not available for a medium, it is not possible to construct a data model of a disk. Therefore, write operations to the disk cannot be simulated using a software program. According to the present invention however, it is still possible to more accurately optimize write powers for every zone of a disk although structural data is not available.

Figure 8:
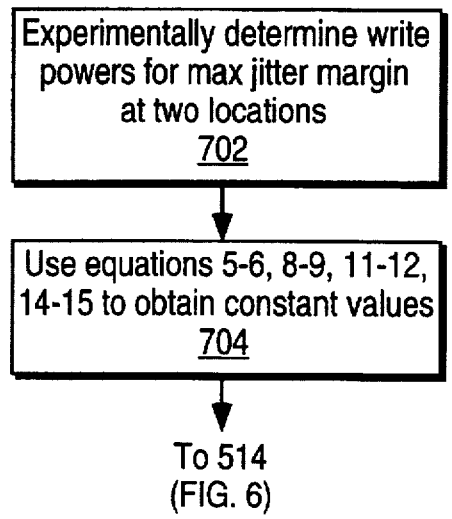
FIG. 8 is a flow diagram of the process of optimizing write powers when no structural data for the medium is available.

Referring to FIG. 8, a flow chart of a method of an embodiment of the present invention for use when structural data is not available is shown. Write powers which yield a maximum jitter margin are empirically determined for two zones on a disk at step 702. Values of constants h, k, m, c, $\alpha$, $\beta$, $\gamma$ and $\delta$ are then obtained in step 704 using equations (5), (6), (8), (9), (11), (12), (14) and (15). Values of constants h, k, m and c can alternatively be obtained using equations (7), (10), (13) and (16), respectively. Once values of constants $\alpha$, $\beta$, $\gamma$ and $\delta$ are obtained, they are then stored on the storage device along with equations 1–4 or 1, 2, 17, and 4 according to step 514, as shown in FIG. 6. Thereafter, the equations are used with the values of the constants to determine optimum write powers for any zone of the medium even though the medium structural data is not known.

Figure 12:
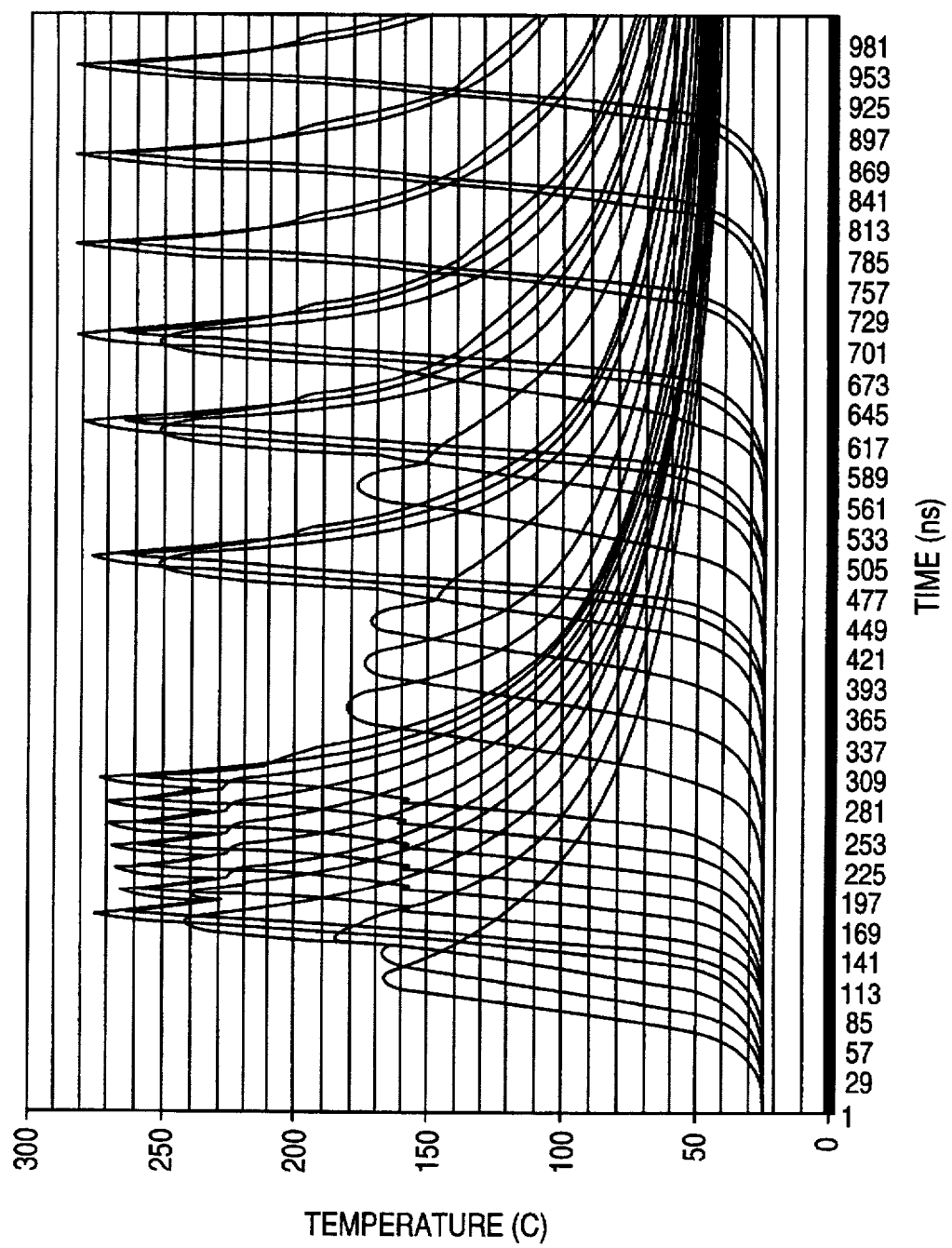
FIG. 12 is a temperature profile illustrating the linear relationship between Pm(v) and Pk(v) at a middle diameter of the disk.
Figure 13:
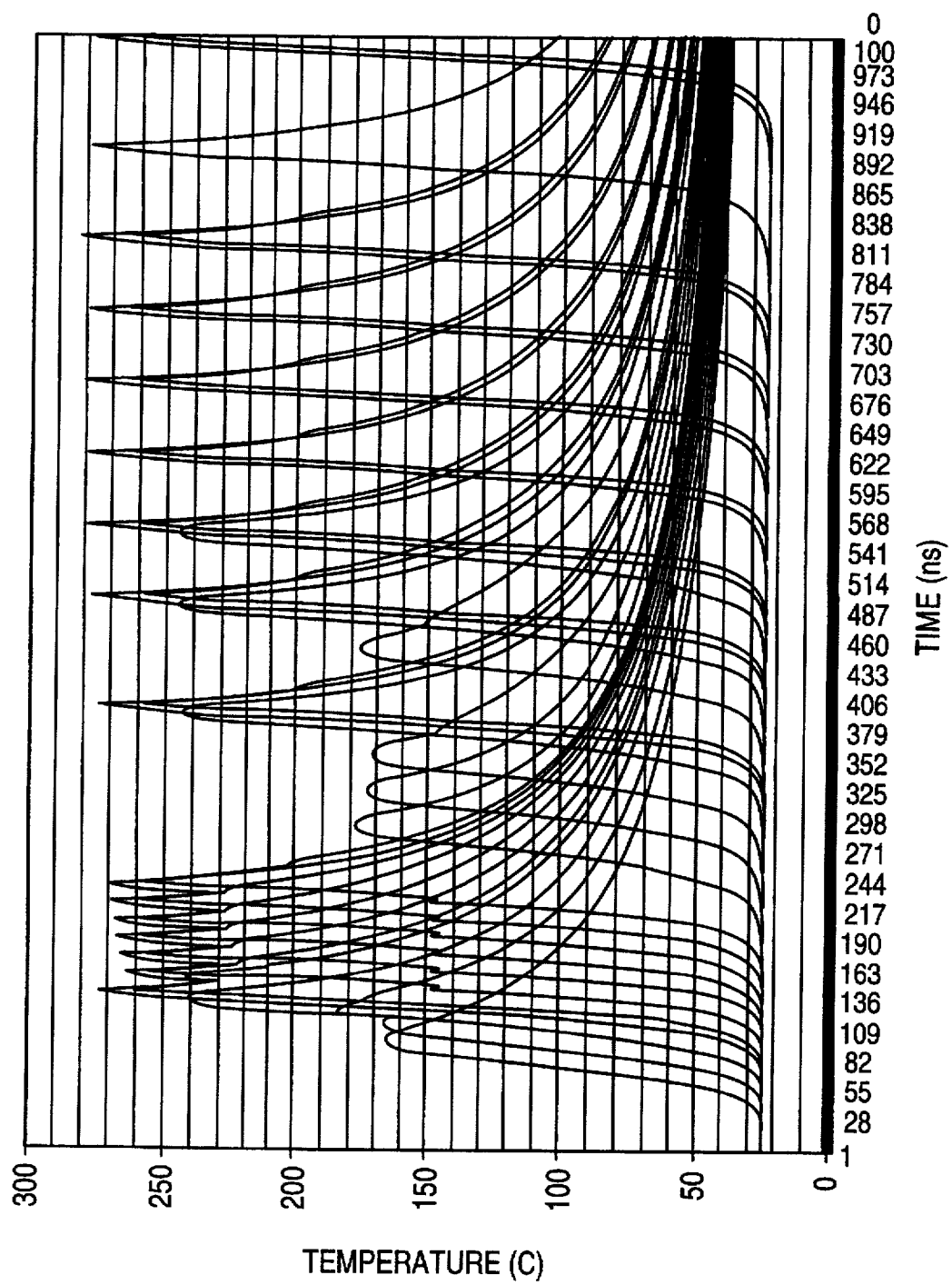
FIG. 13 is a temperature profile illustrating the linear relationship between the Pm(v) and Pk(v) at an outer diameter of the disk.

The linear relationship stated in equation (18) is experimentally verified. Referring to FIGS. 12 and 13, FIG. 12 is a temperature profile of a write operation on a middle radius of a disk of a particular medium. Velocity of the medium for FIG. 12, or, $v_1$, was 16.74 m/s. Maintenance power Pm was 6.16 milliwatts and peak power Pk was 5.71 milliwatts. Applying equation (18):

$$s=Pm(v_1)-Pk(v_1)=6.16-5.71=0.45$$

FIG. 13 shows the temperature profile of a write operation on the outer diameter of the same medium where velocity $v_2$ was 21.12 m/s. Applying equation (18):

$$s=Pm(v_2)-Pk(v_2)=6.79-6.34=0.45$$

As shown above, the value of constant s remains 0.45 for the medium even though linear velocity, Pk and Pm vary.

For the embodiments of the present inventions that have been described, optimum write powers for each zone of a disk of a particular medium are determined and used. In an alternate embodiment, sets of optimum powers for each track of a disk are determined by calculating powers at velocities occurring at each track rather than at velocities occurring at each zone. In this embodiment, the sets of optimum write powers are more numerous, and therefore take more storage space. In some cases, it may nonetheless be preferable to determine optimum powers for each track.

In another alternate embodiment of the invention, all optimum write powers are calculated for various, different media and pre-stored on a storage device of the disk drive in a look-up table or other software data structure. In this embodiment, it is not necessary for the disk drive to calculate and store the write powers for a medium after it recognizes the medium. Rather, the look-up table is referenced immediately upon recognition of the medium, saving operation time.

For the embodiments described, a writing method using four different powers is used. It is also possible to use the present invention to more accurately determine write powers where a different writing method is used, for example, a method using a single write power.

What is claimed is:

1. A magneto-optical disk drive, comprising:
 a drive controller that controls operation of a laser source and a disk drive mechanism, the drive controller comprising:
 a microprocessor; and
 a memory subsystem coupled to the microprocessor comprising a memory device that stores information used by the programs during operation of the recording apparatus, the information comprising:
 an identifier that matches an identifier of a magnetic medium;
 a set of constant values characteristic of physical properties of the magnetic medium comprising constant values denoted by h, k, s, c, $\alpha$, $\beta$ and $\delta$; and
 a set of equations that determine optimum write powers as functions of linear velocity, v, of the magnetic medium, comprising:
 $Ph(v)=hv^\alpha$, where $Ph(v)$ is a preheat power;
 $Pk(v)=kv^\beta$, where $Pk(v)$ is a peak power;
 $Pm(v)=Pk(v)+s$, where $Pm(v)$ is a maintenance power; and
 $Pc(v)=cv^\delta$, where $Pc(v)$ is a cooling power.

2. The magneto-optical recording apparatus of claim 1, wherein the set of constant values further comprises a constant value denoted by m and wherein the set of equations further comprises $Pm(v)=mv^\gamma$.

3. The magneto-optical recording apparatus of claim 1, wherein the memory subsystem further comprises a memory device that stores the programs defining operation of the drive controller, and wherein the programs include a program that calculates sets of optimum write powers for particular portions of a magnetic medium according to the set of equations and the set of constant values.

4. The magneto-optical recording apparatus of claim 2, wherein the memory subsystem further comprises a memory device that stores the programs defining operation of the drive controller, and wherein the programs include a program that calculates sets of optimum write powers for particular portions of a magnetic medium according to the set of equations and the set of constant values.

5. The magneto-optical recording apparatus of claim 3, wherein the particular portions of the magnetic medium are zones of the magnetic medium.

6. The magneto-optical recording apparatus of claim 3, wherein the particular portions of the magnetic medium are tracks of the magnetic medium.

7. The magneto-optical recording apparatus of claim 3, wherein the memory device stores the information used by the programs in a look-up table.

8. A magneto-optical recording apparatus for recording information to and reading information from a rotating disk comprising a magnetic medium with a plurality of zones, the recording apparatus comprising:

an interface controller that controls communication with a host device;

a drive controller coupled to the interface controller that controls rotation of the disk, the drive controller comprising;

a microprocessor that executes programs defining operation of the drive controller; and a memory subsystem coupled to the microprocessor comprising a memory device that stores information used by the programs during operation of the recording apparatus, the information comprising:

an identifier that matches an identifier stored on the magnetic medium;

a set of constant values associated with the magnetic medium comprising constant values denoted by h, k, s, c, $\alpha$, $\beta$ and $\delta$; and a set of equations that determine optimum write powers as functions of linear velocity, v, of the magnetic medium, comprising:

$Ph(v)=hv^{\alpha}$, where $Ph(v)$ is a preheat power;
$Pk(v)=kv^{\beta}$, where $Pk(v)$ is a peak power;
$Pm(v)=Pk(v)+s$, where $Pm(v)$ is a maintenance power; and
$Pc(v)=cv^{\delta}$, where $Pc(v)$ is a cooling power;

a disk drive mechanism and circuit coupled to the drive controller that causes the disk to rotate in response to signals from the drive controller; and a laser control mechanism and circuit coupled to the drive controller and comprising a laser source directed toward the disk, the laser control mechanism and circuit operating the laser source in response to signals from the drive controller.

9. The magneto-optical recording apparatus of claim 8, wherein the set of constant values further comprises a constant value denoted by m and wherein the set of equations further comprises $Pm(v)=mv^{\gamma}$.

10. The magneto-optical recording apparatus of claim 8 wherein the memory subsystem further comprises a memory device that stores the programs defining operation of the drive controller, and wherein the programs include a program that calculates sets of optimum write powers for particular portions of a magnetic medium according to the set of equations and the set of constant values.

11. The magneto-optical recording apparatus of claim 9 wherein the memory subsystem further comprises a memory device that stores the programs defining operation of the drive controller, and wherein the programs include a program that calculates sets of optimum write powers for particular portions of a magnetic medium according to the set of equations and the set of constant values.

12. A magneto-optical disk drive, comprising:

a drive controller that controls operation of a laser source and a disk drive mechanism, the drive controller comprising:

a microprocessor; and a memory subsystem coupled to the microprocessor that stores programs executed by the microprocessor and data used by the programs, the memory subsystem comprising at least one memory device, the memory subsystem produced by:

storing on the memory device a plurality of identifiers each corresponding to a disk drive medium having a particular structure;

storing on the memory device a plurality of sets of constant values each associated with one of the plurality of identifiers, each set of constant values comprising constant values denoted by h, k, s, c, $\alpha$, $\beta$ and $\delta$; and storing on the memory device a set of equations that determine optimum write powers as functions of linear velocity, v, of the magnetic medium, comprising:

$Ph(v)=hv^{\alpha}$, $Ph(v)$ is a preheat power;
$Pk(v)=kv^{\beta}$, where $Pk(v)$ is a peak power;
$Pm(v)=Pk(v)+s$, where $Pm(v)$ is a maintenance power; and
$Pc(v)=cv^{\delta}$, where $Pc(v)$ is a cooling power.

13. A magneto-optical disk drive, comprising:

a drive controller that controls operation of a laser source and a disk drive mechanism, the drive controller comprising:

a microprocessor; and a memory subsystem coupled to the microprocessor that stores programs executed by the microprocessor and data used by the programs, the memory subsystem comprising at least one memory device;

the magneto-optical disk drive produced by:

storing on the memory device a plurality of identifiers each corresponding to a disk drive magnetic medium having a particular structure;

storing on the memory device a plurality of sets of constant values each associated with one of the plurality of identifiers, each set of constant values comprising constant values denoted by h, k, m, c, $\alpha$, $\beta$, $\gamma$ and $\delta$; and storing on the memory device a set of equations that determine optimum write powers as functions of linear velocity, v, of the magnetic medium, comprising:

$Ph(v)=hv^{\alpha}$, where $Ph(v)$ is a preheat power;
$Pk(v)=kv^{\beta}$, where $Pk(v)$ is a peak power;
$Pm(v)=mv^{\gamma}$, where $Pm(v)$ is a maintenance power; and
$Pc(v)=cv^{\delta}$, where $Pc(v)$ is a cooling power.

14. In a magneto-optical (MO) recording system for recording information on a disk, the disk comprising a medium having a plurality of zones, a method for recording information on the disk, comprising the steps of:

storing a plurality of identifiers on a storage device of the recording system, each of the plurality of identifiers corresponding to a medium;

for each of the plurality of identifiers, storing on a storage device of the recording system a set of constant values denoted by h, k, c, s, $\alpha$, $\beta$ and $\delta$;

reading a disk including comparing an identifier stored on the disk with the plurality of identifiers to find a match; and when a match is found, calculating a set of optimum write powers corresponding to the identifier on the disk, the set of optimum write powers comprising optimum preheat power Ph(v), optimum peak power Pk(v), optimum maintenance power Pm(v) and optimum cooling power Pc(v) for each of the plurality of zones, the set of optimum write powers calculated according to a set of equations:

$$Ph(v) = hv^{\alpha};$$

$$Pk(v) = kv^{\beta};$$

$$Pm(v) = Pk(v) + s;$$

and $$Pc(v) = cv^{\delta};$$

where v is a linear velocity of the medium.

15. The method of claim 14, further comprising the steps of:

writing to a zone of the disk located at a radius i using a subset of the set of optimum write powers comprising $Ph(v_i)$, $Pk(v_i)$, $Pm(v_i)$ and $Pc(v_i)$ where $v_i$ is a linear velocity of the medium at the zone of radius i;

storing the set of optimum write powers on the storage device; and reading from the zone of radius i using $Pc(v_i)$.

16. The method of claim 14, wherein the step of calculating the set of optimum write powers for each of the plurality of zones comprises calculating a set of optimum write powers for each of a plurality of tracks in a zone.

17. The method of claim 16, further comprising the steps of:

writing to a track of the disk located within a zone i at a radius ii using a subset of the set of optimum write powers comprising $Ph(v_{ii})$, $Pk(v_{ii})$, $Pm(v_{ii})$ and $Pc(v_{ii})$ where $vi_{ii}$ is a linear velocity of the medium at the track of radius ii;

storing the set of optimum write powers on the storage device; and reading from the track of radius ii using $Pc(v_{ii})$.

18. In a magneto-optical (MO) recording system for recording information on a disk, the disk comprising a medium having a plurality of zones, a method for recording information on the disk, comprising the steps of:

storing a plurality of identifiers on a storage device of the recording system, each of the plurality of identifiers corresponding to a medium;

for each of the plurality of identifiers, storing on a storage device of the recording system a set of constant values denoted by h, k, m, c, $\alpha$, $\beta$, $\gamma$ and $\delta$;

reading a disk including comparing an identifier on the disk with the plurality of identifiers to find a match;

when a match is found, calculating a set of optimum write powers corresponding to the identifier on the disk, the set of optimum write powers comprising optimum preheat power Ph(v), optimum peak power Pk(v), optimum maintenance power Pm(v) and optimum cooling power Pc(v) for each of the plurality of zones, the set of optimum write powers calculated according to equations:

$$Ph(v) = hv^{\alpha};$$

$$Pk(v) = kv^{\beta};$$

$$Pm(v) = mv^{\gamma};$$

and $$Pc(v) = cv^{\delta};$$

where v is a linear velocity of the medium; and storing the set of optimum write powers on the storage device.

19. The method of claim 18, further comprising the steps of:

writing to a zone of the disk located at a radius i using a subset of the set of optimum write powers comprising $Ph(v_i)$, $Pk(v_i)$, $Pm(v_i)$ and $Pc(v_i)$ where $v_i$ is a linear velocity of the medium at the zone of radius i; and reading from the zone of radius i using $Pc(v_i)$.

20. The method of claim 18, wherein the step of storing the set of constant values on the storage device of the recording system comprises the steps of:

empirically determining an optimum peak power $Pk(v_j)$ for a zone j of the plurality of zones, $Pk(v_j)$ corresponding to an optimum jitter margin, where $v_j$ is a linear velocity of the medium at zone j;

recording a temperature profile of the medium obtained by heating the medium using the optimum peak power;

simulating recording information on each of the remaining zones to determine optimum write powers Ph(v), Pk(v), Pm(v) and Pc(v) such that temperature profiles of the medium at each of the remaining zones substantially match the temperature profile at zone j; and plotting powers Ph(v) as a function of linear velocity v;

from the plot of powers Ph(v), obtaining constant values h and $\alpha$;

plotting powers Pk(v) as a function of linear velocity v;

from the plot of powers Pk(v), obtaining constant values k and $\beta$;

plotting powers Pm(v) as a function of linear velocity v;

from the plot of powers Pm(v), obtaining constant values m and $\gamma$;

plotting powers Pc(v) as a function of linear velocity v; and from the plot of powers Pc(v), obtaining constant values c and $\delta$.

21. In a magneto-optical (MO) recording system for recording information on a disk, the disk comprising a magnetic medium having a plurality of zones, a method for recording information on the disk, comprising the steps of:

performing a write operation on a first zone including the steps of:

applying a laser beam to the zone having a preheat power Ph;

applying a laser beam to the zone having a peak power Pk;

applying a laser beam to the zone having a maintenance power Pm; and applying a laser beam to the zone having a cooling power Pc;

empirically determining first optimum powers at which an optimum jitter margin is attained, including a first optimum preheat power $Ph(v_0)$, a first optimum peak power $Pk(v_0)$, a first optimum maintenance power $Pm(v_0)$, and a first optimum cooling power $Pc(v_0)$;

performing a write operation on a second zone;

empirically determining second powers at which an optimum jitter margin is attained, including a second optimum preheat power $Ph(v_1)$, a second optimum peak power $Pk(v_1)$, a second optimum maintenance power $Pm(v_1)$, and a second optimum cooling power $Pc(v_1)$;

calculating a value α according to $$\alpha = \frac{\log_x\left[\frac{Ph(v_0)}{Ph(v_1)}\right]}{\log_x\left[\frac{v_0}{v_1}\right]} ;$$

calculating a value a value h according to $$h = \frac{Ph(v_0)}{v_0^\alpha} ;$$

calculating a value β according to $$\beta = \frac{\log_x\left[\frac{Pk(v_0)}{Pk(v_1)}\right]}{\log_x\left[\frac{v_0}{v_1}\right]} ;$$

calculating a value k according to $$k = \frac{Pk(v_0)}{v_0^\beta} ;$$

calculating a value γ according to $$\gamma = \frac{\log_x\left[\frac{Pm(v_0)}{Pm(v_1)}\right]}{\log_x\left[\frac{v_0}{v_1}\right]} ;$$

calculating a value m according to $$m = \frac{Pm(v_0)}{v_0^\gamma} ;$$

calculating a value δ according to $$\delta = \frac{\log_x\left[\frac{Pc(v_0)}{Pc(v_1)}\right]}{\log_x\left[\frac{v_0}{v_1}\right]} ; \text{ and}$$

calculating a value c according to $$c = \frac{Pc(v_0)}{v_0^\delta} .$$

22. The method of claim 21, further comprising the step of storing values h, k, m, c, α, β, γ and δ on a storage device of the recording system.

23. The method of claim 22, further comprising the steps of:

receiving the disk in the recording system;

calculating a set of optimum write powers for the disk, the set of optimum write powers comprising optimum preheat power Ph(v), optimum peak power Pk(v), optimum maintenance power Pm(v) and optimum cooling power Pc(v) for each of the plurality of zones, the set of optimum write powers calculated according to equations:

$$Ph(v) = hv^\alpha;$$

$$Pk(v) = kv^\beta;$$

$$Pm(v) = mv^\gamma;$$

and $$Pc(v) = cv^\delta;$$

where v is a linear velocity of the medium; and storing the set of optimum write powers on the storage device.

24. The method of claim 23, further comprising the steps of:

writing to a zone of the disk located at a radius i using a subset of the set of optimum write powers comprising $Ph(v_i)$, $Pk(v_i)$, $Pm(v_i)$ and $Pc(v_i)$ where $v_i$ is a linear velocity of the medium at the zone of radius i; and reading from the zone of radius i using $Pc(v_i)$.

25. The method of claim 21, further comprising:

calculating the value h according to $$h = \frac{Ph(v_1)}{v_1^\alpha} ;$$

calculating the value k according to $$k = \frac{Pk(v_1)}{v_1^\beta} ;$$

calculating the value m according to $$m = \frac{Pm(v_1)}{v_1^\gamma} ; \text{ and}$$

calculating the value c according to $$c = \frac{Pc(v_1)}{v_1^\delta} .$$

* * * * *